(12) United States Patent
Kumazawa et al.

(10) Patent No.: US 9,098,084 B2
(45) Date of Patent: Aug. 4, 2015

(54) TRANSPORT CARRIAGE SYSTEM AND METHOD FOR CONTROLLING RUNNING OF TRANSPORT CARRIAGE

(75) Inventors: Tsuyoshi Kumazawa, Kyoto (JP); Hajime Sato, Kyoto (JP); Takeshi Murakami, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 16 days.

(21) Appl. No.: 13/984,935

(22) PCT Filed: Oct. 24, 2011

(86) PCT No.: PCT/JP2011/074399
§ 371 (c)(1),
(2), (4) Date: Aug. 12, 2013

(87) PCT Pub. No.: WO2012/111193
PCT Pub. Date: Aug. 23, 2012

(65) Prior Publication Data
US 2013/0317675 A1    Nov. 28, 2013

(30) Foreign Application Priority Data
Feb. 14, 2011 (JP) ................. 2011-028270

(51) Int. Cl.
*G06F 7/00* (2006.01)
*G05D 1/00* (2006.01)
(Continued)

(52) U.S. Cl.
CPC .............. *G05D 1/021* (2013.01); *G05B 19/416* (2013.01); *G05B 19/4189* (2013.01); *G05B 2219/43048* (2013.01); *G05B 2219/43162* (2013.01); *G05B 2219/50393* (2013.01)

(58) Field of Classification Search
CPC ......... G06F 7/00; G05D 1/021; G05B 19/416
USPC ............................................. 701/19
See application file for complete search history.

(56) References Cited

U.S. PATENT DOCUMENTS 7,561,254 B2 * 7/2009 Koide ........................ 356/4.01
2007/0100517 A1 * 5/2007 Kim ............................ 701/19
(Continued)

FOREIGN PATENT DOCUMENTS

JP          63-72601 U      5/1988
JP          2004-334324 A   11/2004
(Continued)

OTHER PUBLICATIONS

Official Communication issued in International Patent Application No. PCT/JP2011/074399, mailed on Nov. 15, 2011.
(Continued)

*Primary Examiner* — Calvin Cheung
*Assistant Examiner* — Martin Weeks
(74) *Attorney, Agent, or Firm* — Keating & Bennett, LLP (57) ABSTRACT

In a transport carriage system, multiple transport carriages travel along a common track and each transport carriage includes a servo system that performs servo control with respect to traveling of the transport carriage, and an intermediate instruction of the servo system is generated in a predetermined cycle by an acceleration/deceleration control unit of a traveling control unit. A smoothed instruction is generated for the predetermined cycle by smoothing the generated intermediate instruction over a plurality of cycles with a smoothing unit of the traveling control unit, and the servo system is controlled based on the smoothed instruction that was generated.

16 Claims, 9 Drawing Sheets

(51) Int. Cl.
*G05B 19/416* (2006.01)
*G05D 1/02* (2006.01)
*G05B 19/418* (2006.01)

(56) References Cited

U.S. PATENT DOCUMENTS

2007/0192910 A1* 8/2007 Vu et al. .......................... 901/17
2010/0162793 A1* 7/2010 Kaneko et al. ............... 73/35.01
2011/0118914 A1* 5/2011 Brooks et al. ................... 701/20
2011/0315496 A1* 12/2011 Bohori et al. ................... 191/10

FOREIGN PATENT DOCUMENTS

| JP | 2005-165543 A | 6/2005 |
| JP | 3791643 B2 | 6/2006 |
| JP | 2009-242063 A | 10/2009 |

OTHER PUBLICATIONS

English Abstract of CN 101281391A.

* cited by examiner

TRANSPORT CARRIAGE SYSTEM AND METHOD FOR CONTROLLING RUNNING OF TRANSPORT CARRIAGE

BACKGROUND OF THE INVENTION

1. Field of the Invention

The present invention relates to a transport carriage system, and in particular to a system in which multiple transport carriages travel on a common track.

2. Description of the Related Art

In a known transport system, for example, two stacker cranes travel back and forth on a common track, and interference is avoided through communication between the cranes (JP 3791643B). With this technology, multiple cranes communicate their current position, velocity, target position, and the like to each other in order to travel and stop when necessary so as to avoid interference. Note that multiple stacker cranes travel along a common track in order to raise transport performance in an automated warehouse or the like. Also, in order to improve the level of cleanliness in an automated warehouse, the stacker cranes receive electricity from a common contactless power feeding apparatus.

In accordance with instruction from a host controller, a stacker crane travels to a destination in order to deliver and receive articles, for example. Upon receiving an instruction regarding a destination from the host controller, the stacker crane generates a velocity pattern for the range up to the destination using an on-board controller, and inputs the velocity pattern data to the servo system of a traveling motor. The servo system travels such that error between the input velocity pattern and the actual velocity is eliminated. Since multiple cranes travel on a common track, there are cases where, for example, the destination is changed in order to avoid interference or the like, or the target velocity is changed to conform to a leading stacker crane so as to follow it. This leads to the possibility of the crane or the transported articles being negatively influenced due to a sudden change in the instruction input to the servo system, or a sudden change in acceleration/deceleration.

SUMMARY OF THE INVENTION

Preferred embodiments of the present invention prevent sudden changes in an instruction input to a servo system.

Preferred embodiments of the present invention also enable an intermediate instruction to be generated in a simple manner, and to enable a transport carriage to travel efficiently.

Additionally, preferred embodiments of the present invention significantly reduce the size of a ground-based contactless power feeding apparatus.

According to a preferred embodiment of the present invention, a transport carriage system in which a plurality of transport carriages travel includes a common track on which the plurality of transport carriages travel; a servo system that is provided in each of the transport carriages and performs servo control with respect to traveling of the transport carriages; and a traveling control unit that is arranged and programmed to control the servo system and which includes an acceleration/deceleration control unit that is arranged and programmed to generate an intermediate instruction for the servo system for a predetermined cycle and a smoothing unit that is arranged and programmed to generate a smoothed instruction for the predetermined cycle by smoothing the intermediate instruction over a plurality of cycles. Furthermore, in the present preferred embodiment of the present invention, the acceleration/deceleration control unit is preferably arranged and programmed to generate the intermediate instruction with respect to a current cycle for each predetermined cycle such that each transport carriage travels at a maximum velocity in a range that satisfies a constraint condition regarding traveling of the transport carriage, and to store the constraint condition in a variable manner.

Another preferred embodiment of the present invention is a transport carriage traveling control method for controlling traveling of a plurality of transport carriages, the plurality of transport carriages traveling along a common track, the transport carriages each including a servo system that performs servo control with respect to traveling of the transport carriages, and the method including an intermediate instruction generation step which generates an intermediate instruction with respect to a current cycle for the servo system in a predetermined cycle such that the transport carriage travels at a maximum velocity in a range that satisfies a constraint condition regarding traveling of the transport carriage, with an acceleration/deceleration control unit of a traveling control unit; a smoothing step which generates a smoothed instruction for the predetermined cycle by smoothing the intermediate instruction over a plurality of cycles with a smoothing unit of the traveling control unit; a control step which controls the servo system based on the smoothed instruction that was generated, and a step for storing the constraint condition in the acceleration/deceleration control unit in a variable manner.

In the present preferred embodiment of the present invention, furthermore, the transport carriage can travel to the destination in a minimum amount of time within the range that satisfies the constraint condition, and in the case where priority is to be given to energy efficiency or the like over traveling in the minimum amount of time, it is sufficient to change a constraint condition regarding the maximum velocity, the maximum acceleration, or the like. Also, the intermediate instruction only includes an instruction for the current cycle, and does not include an instruction for the range up to the destination as with a velocity pattern. Since the intermediate instruction for the current cycle is generated so as to travel with the maximum velocity, the intermediate instruction can be easily generated, and there is no need to discard a generated intermediate instruction even if a constraint condition is changed.

It is preferable that the smoothing unit is arranged and programmed to generate the smoothed instruction by moving averaging of the intermediate instruction over a plurality of cycles. Even if the intermediate instruction suddenly changes during traveling, the smoothed instruction changes gradually due to being defined by the moving averaging of multiple intermediate instructions.

It is preferable that the traveling control unit further includes a filter that generates a servo position instruction by removing one of high frequency components and signals in a vicinity of a characteristic frequency of the transport carriage from the smoothed instruction, and input the servo position instruction to the servo system. There is the possibility of signals in the vicinity of the characteristic frequency of the transport carriage being included in the time series of the smoothed instruction. In view of this, a filter is used to convert the time series of the smoothed instruction into a signal in a frequency axis domain, and remove high frequency components in the signal in the frequency axis domain or remove components in the vicinity of the characteristic frequency.

It is preferable that the acceleration/deceleration control unit is arranged and programmed to generate the intermediate instruction so as to satisfy a constraint condition regarding at least a maximum velocity, a maximum acceleration, and a maximum deceleration of the transport carriage. Since the constraint conditions are variable, it is possible to set stricter constraints at places where the track state is poor, and constrain the maximum velocity to a low value at places where there is a desire to reduce transport carriage traveling wind, for example. On the other hand, it is possible to allow travel with looser constraints in places where the track state is favorable and there are no restrictions with respect to traveling wind or the like. The intermediate instruction can then be generated such that the transport carriage travels at the maximum velocity while satisfying the constraints on the maximum velocity, the maximum acceleration, and the maximum deceleration.

It is preferable that the intermediate instruction includes one of a target position for the current cycle and a target velocity for the current cycle, and it is particularly preferable that the intermediate instruction includes the target position for the current cycle. When generating the intermediate instruction, the target velocity for the current cycle is determined in order to determine the target position for the next cycle, and the target position for the current cycle is determined based on the target velocity for the previous cycle. The intermediate instruction is generated in this way, for example.

It is preferable that the transport carriage system further includes a host controller that is provided so as to be ground-based and is programmed to give a destination instruction to the transport carriages, the traveling control unit is provided in each of the transport carriages, the traveling control unit further includes a communication unit that communicates with the host controller and other transport carriages, and a destination change unit that changes the destination indicated by the instruction from the host controller based on current positions, current velocities, and destinations received from other transport vehicles, and outputs the changed destination, and the acceleration/deceleration control unit is arranged and programmed to generate one of the target position and the target velocity for the current cycle based on a deviation between the destination output by the destination change unit and the current position of the transport carriage.

As a result, the transport carriage can autonomously perform traveling control, and the amount of communication between the carrier vehicle and the host controller can be reduced compared to the case of providing a traveling control unit in the host controller.

It is preferable that the transport carriages each further include a vehicle-mounted power supply arranged to drive the servo system, and a power controller that is arranged and programmed to manage the vehicle-mounted power supply, and the traveling control unit further includes an acceleration restriction unit that changes the maximum acceleration in accordance with a signal from the power controller. As a result, the transport carriage changes the maximum acceleration in accordance with the state of the vehicle-mounted power supply and the amount of power than can be retrieved from the vehicle-mounted power supply, for example, thus being able to travel without a power shortage occurring.

It is particularly preferable that the vehicle-mounted power supply is defined by a power receiving coil that receives power from a common ground-based contactless power feeding apparatus, and a capacitor that accumulates received power. The power controller determines the amount of power that can be retrieved based on the amount of power accumulated in the capacitor, and determines the extent of the load on the contactless power feeding apparatus based on the output voltage and the output current of the power receiving coil, and the like. Accordingly, by changing the maximum acceleration, it is possible to reduce the amount of power retrieved from the power receiving coil when the load on the contactless power feeding apparatus is high. It is therefore sufficient to have a low-performance contactless power feeding apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments for carrying out the present invention. FIGS. 1 to 9 show a transport carriage system according to a preferred embodiment of the present invention and characteristics thereof. In the figures, 2 denotes transport carriages and 4 denotes a host controller that is provided on the ground and is programmed to control multiple transport carriages 2. Each transport carriage 2 preferably includes a communication unit 6 and communicates with the host controller 4, other transport carriages 2, and a ground facility 34 such as, for example, a loading port or a buffer. The transport carriage 2 preferably includes a traveling control unit 8 that is arranged and programmed to control a servo system 10 that includes a traveling motor, and a position sensor 12 that obtains the traveling direction position of the transport carriage 2 and sends it to the servo system 10 as feedback. The position sensor 12 may be, for example, an encoder of the traveling motor, or may alternatively be a position sensor such as, for example, a laser range finder or a magnetic linear sensor.

Figure 1:
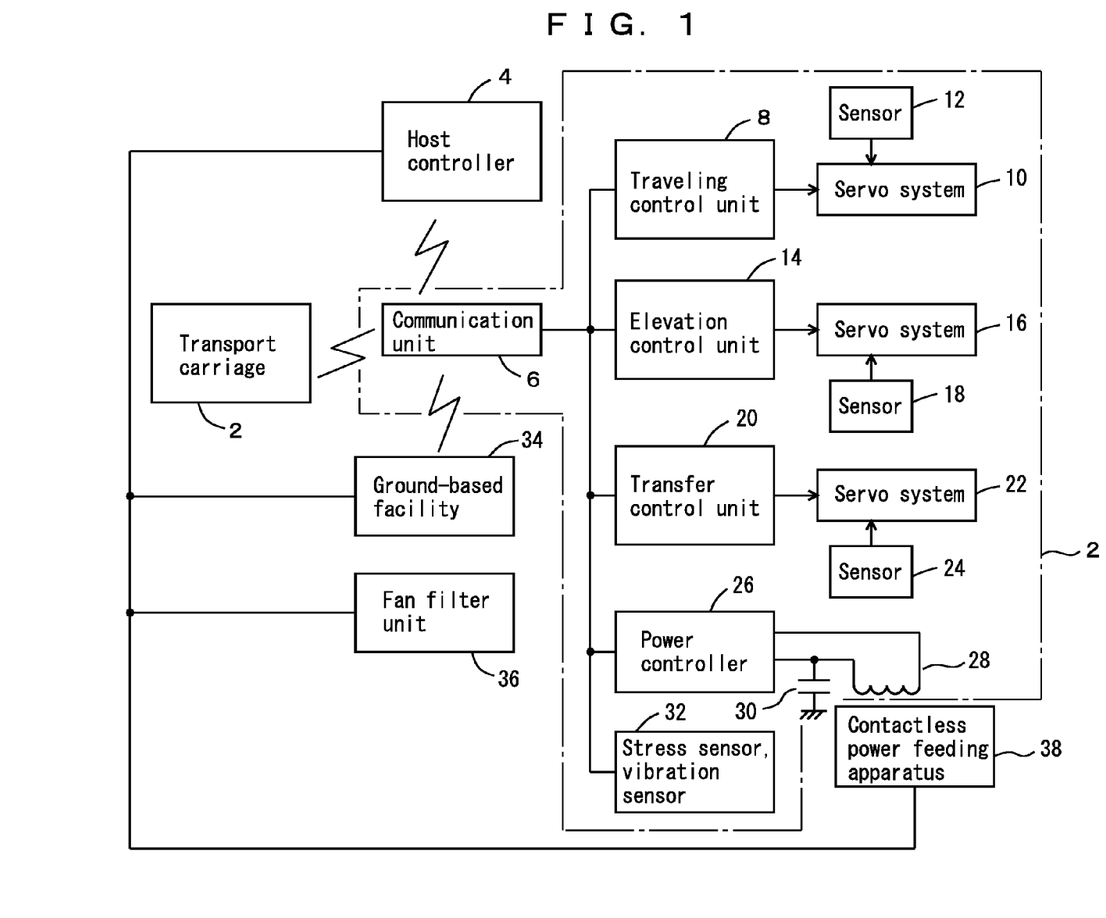
FIG. 1 is an overall block diagram of a transport system according to a preferred embodiment of the present invention.

The transport carriage 2 is preferably a stacker crane for example, but may be a transport carriage that travels back and forth on a common track and does not include a mast or an elevation platform, an overhead travelling vehicle that travels around a common track, or the like. In addition to the traveling control unit 8 and the like, the transport carriage 2 preferably includes an elevation control unit 14 that is arranged and programmed to control a servo system 16, which includes an elevating motor, so as to raise and lower an elevation platform (not shown) along a mast, and a position sensor 18 that sends the height position to the servo system 16 as feedback. Also, the elevation platform preferably includes a transfer apparatus such as, for example, a slide fork or a SCARA arm, and a servo system 22 that includes a transfer motor is controlled by a transfer control unit 20. Also, a position sensor 24 sends data on the position of the slide fork or the like to the servo system 22 as feedback. Since the configurations of the control units 8, 14, and 20 are preferably the same or substantially the same, only the traveling control unit 8 will be described below.

Also, 26 denotes a power controller that is arranged and programmed to control a capacitor 30 and a power receiving coil 28 arranged to receive power from a contactless power feeding line, and supplies power to various motors. Note that the contactless power feeding line is preferably provided along the track, and a contactless power feeding apparatus 38 is configured by the contactless power feeding line and a power feeding source. Note that in place of contactless power feeding, the transport carriage 2 may alternatively be driven with power from the capacitor 30 or a secondary battery (not shown), and in that case, charging apparatuses are provided at multiple locations along the track. Also, the maximum acceleration is restricted as a constraint condition with regards to the amount of power that can be supplied from the capacitor 30 or the secondary battery. The transport carriage 2 preferably also includes multiple stress sensors and vibration sensors 32 (e.g., acceleration sensors), which measure the stress and vibration that various units of the transport carriage 2 are subjected to and input the measured values to the control units 8, 14, and 20, which then change the maximum acceleration, the maximum deceleration, the amount of change in maximum acceleration, and the amount of change in maximum deceleration. Note that vibration sensors do not need to be provided.

The transport carriages 2 preferably all have the same configuration, move back and forth along the same track, exchange information about their current position, current velocity, destination, and the like with each other via the communication unit 6, and follow each while avoiding interference, for example. The host controller 4 furthermore provides a destination instruction to the transport carriages 2, and provides an instruction regarding transport tasks from pickup to drop off. The transport carriages 2 travel inside an automated warehouse in a clean room, for example. The automated warehouse is preferably provided with a fan filter unit 36 that supplies clean air to stored articles such as, for example, flat panel display cassettes.

Figure 3:
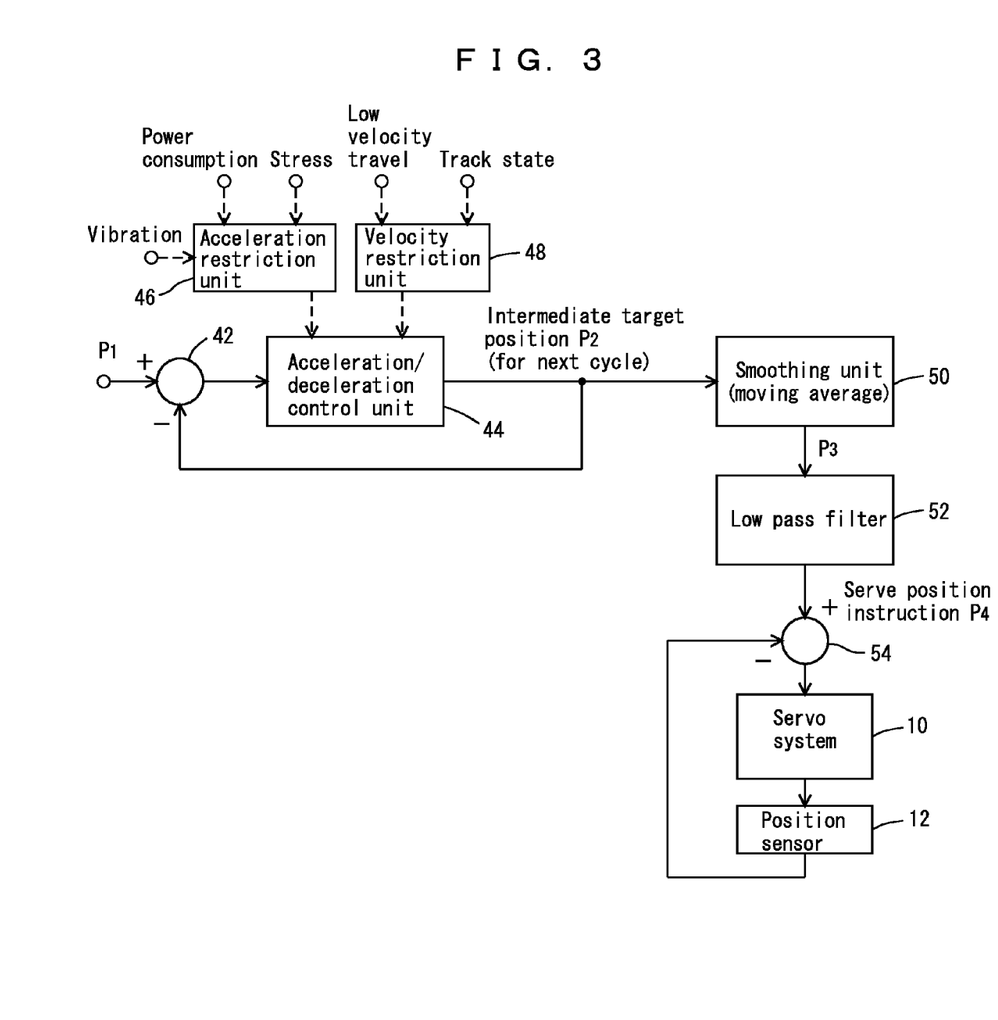
FIG. 3 is a block diagram of the transport system according to a preferred embodiment of the present invention, showing blocks related to the conversion of the destination P1 into a servo position instruction P4.

Although stacker cranes are given as examples of the transport carriage 2 in the present preferred embodiment, the transport carriage 2 may alternatively be a transport carriage that travels back and forth along a track and does not include an elevation platform, an overhead travelling vehicle, or the like. Also, although the transport carriages 2 are provided at positions inside the automated warehouse, the preferred embodiments of the present invention are not limited to this. Furthermore, although the transport carriages 2 are preferably provided with the traveling control unit 8 in the present preferred embodiment, a configuration is possible in which the traveling control unit 8 is provided in the host controller 4, and the servo position instruction P4 shown in FIG. 3 is input from the host controller 4 to the servo system 10. Note that an instruction is input from the traveling control unit 8 to the servo system 10 at a predetermined cycle such as, for example, about 10 msec, which is referred to as one cycle.

Figure 2:
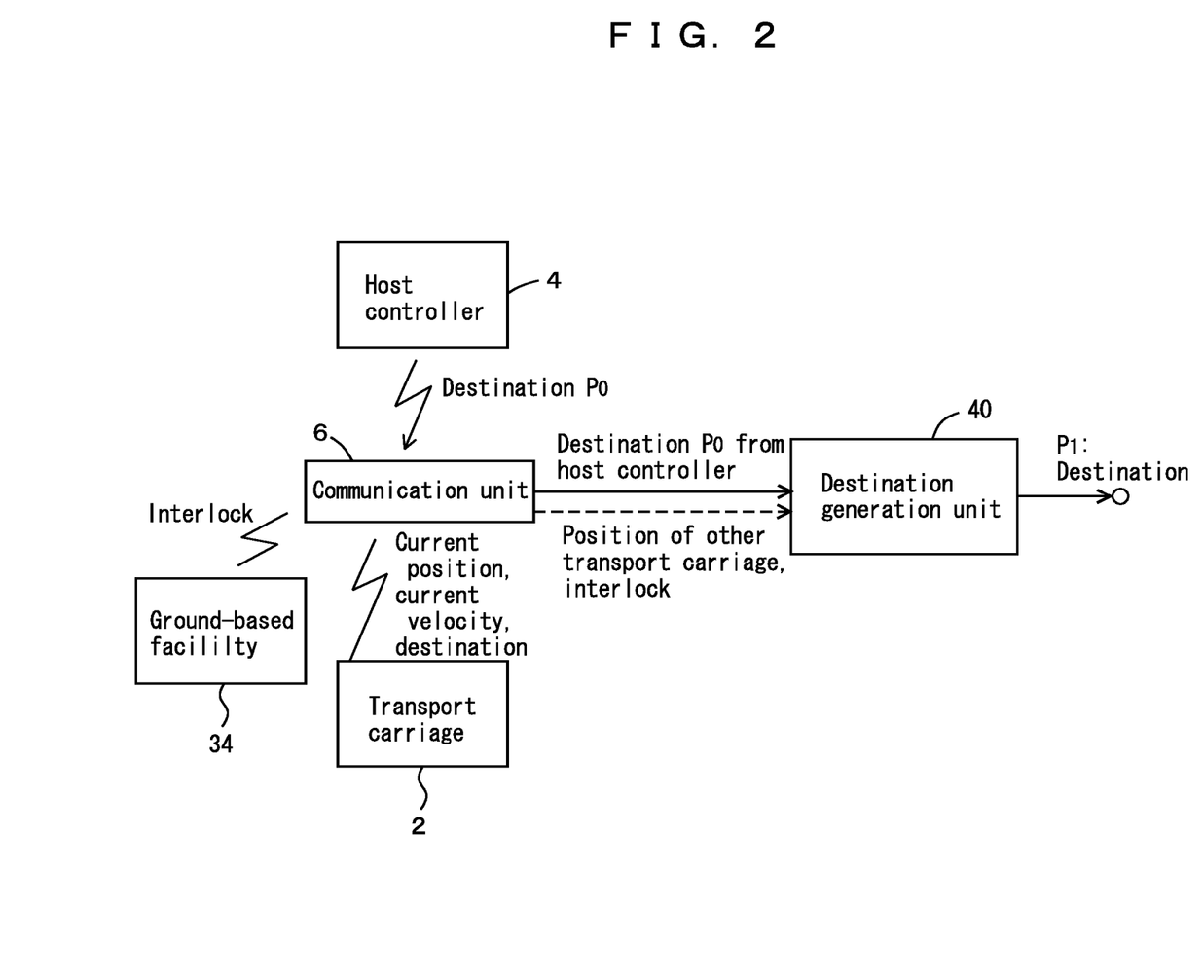
FIG. 2 is a block diagram of the transport system according to a preferred embodiment of the present invention, showing blocks related to the generation of a destination P1.
Figure 4:
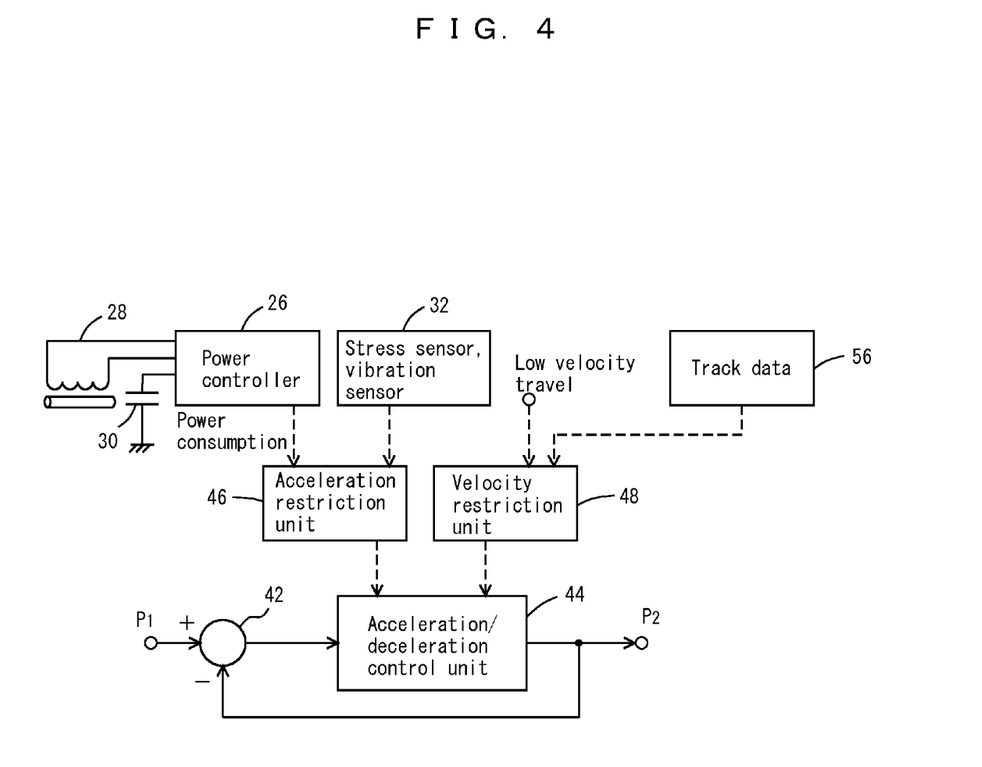
FIG. 4 is a block diagram of the transport system according to a preferred embodiment of the present invention, showing blocks related to constraint conditions, including maximum acceleration, maximum deceleration, and maximum velocity.

FIG. 2 is a diagram showing blocks which generate a destination P1. The host controller 4 preferably irregularly transmits a destination P0 to the transport carriages 2, and the transport carriages 2 preferably report their status (e.g., current position and current velocity) to the host controller 4 every cycle, for example. The communication unit 6 exchanges data such as, for example, the current position, the current velocity, and the destination with other transport carriages 2, and also exchanges signals indicating, for example, interlocking related to article delivery/reception, traveling restrictions, and the like with the ground facility 34 and the like. In FIGS. 2 to 4 that are referenced below, the data indicated by broken lines is constraint data regarding movement of the transport carriages 2, and data indicated by solid lines is other data. The communication unit 6 inputs, to a destination generation unit 40 in the traveling control unit 8, the destination P0 from the host controller, information indicating the current position, current velocity, destination, and the like of another transport carriage, and information related to interlocking and the like. The destination generation unit 40 is preferably arranged and programmed to convert the destination P0 into a destination P1 so as to conform to constraint conditions such as, for example, interlocking and to not cause interference with another transport carriage, and inputs the destination P1 to an error amplifier 42 shown in FIG. 3.

In FIG. 3, 44 denotes an acceleration/deceleration control unit that is arranged and programmed to receive a maximum acceleration and a maximum deceleration as constraint conditions from an acceleration restriction unit 46, and receives a maximum velocity as a constraint condition from a velocity restriction unit 48. The acceleration/deceleration control unit 44 outputs an intermediate target position P2 for the next cycle using the error between the destination P1 and the intermediate target position P2 that was previously output. Here, one cycle is about 10 msec, for example. Also, the acceleration/deceleration control unit 44 may output an intermediate target instruction as an intermediate target velocity or the like, instead of the intermediate target position P2. The acceleration/deceleration control unit 44 determines whether or not it is possible to stop in front of the destination P1 in the case of decelerating at the maximum deceleration, and if it is possible to stop in front of the destination P1, determines the target velocity so as to accelerate at the maximum acceleration. Note that in the case where the maximum velocity will be exceeded by that acceleration, the maximum velocity is set as the target velocity. Also, if it is not possible to stop in front of the destination P1, the target velocity is determined so as to decelerate at the maximum deceleration. In this way, the intermediate target velocity for the next cycle is determined, the intermediate target velocity is multiplied by the duration of one cycle, and the result is set as the intermediate target position P2 for the next cycle.

The acceleration/deceleration control unit 44 preferably stores constraint conditions such as, for example, the maximum acceleration, the maximum deceleration, and the maximum velocity. These constraint conditions are received from the acceleration restriction unit 46 and the velocity restriction unit 48, and are variable. The acceleration restriction unit 46 is arranged and programmed to restrict power consumption in accordance with a signal from the power controller 26, which corresponds to restricting the maximum acceleration. The acceleration restriction unit 46 also preferably restricts the maximum acceleration and the maximum deceleration in accordance with signals from stress sensors, and restricts the amount of change in maximum acceleration, the amount of change in maximum deceleration, and the like in accordance with signals from vibration sensors. The velocity restriction unit 48 changes the maximum velocity in accordance with an instruction from the host controller 4, for example. Specifically, the maximum velocity is reduced in the case where the transport amount is low, and there is no need for transport at a high speed. Additionally, the maximum velocity is reduced in the vicinity of articles for which contamination is to be avoided, and the maximum velocity is restricted to a low value in the vicinity of the two ends of the automated warehouse since articles on shelves tend to be hit by the backflow of wind raised by the transport carriages 2. Furthermore, the maximum velocity, the maximum acceleration, and the maximum deceleration are preferably restricted according to the state of the track. Additionally, the maximum velocity is restricted according to velocity relative to another transport carriage. Note that if different constraint conditions are received for the same item, the strictest constraint condition is applied.

The optimization of constraints on the traveling of the transport carriages 2 in accordance with the state of the transport carriage system is preferably achieved by the application of constraint conditions by the acceleration restriction unit 46 and the velocity restriction unit 48, and causing the transport carriages 2 to travel with the highest acceleration and deceleration and maximum velocity within the range of the constraint conditions. Furthermore, the acceleration/deceleration control unit 44 only generates the intermediate target position P2 for the next cycle, and does not generate the intermediate target position for cycles after that. In other words, instead of generating a velocity pattern for the range of the current position to the destination P0, the intermediate target position P2 for the next cycle is repeatedly generated.

A smoothing unit 50 is arranged and programmed to convert the intermediate target position P2 into a smoothed target position P3 by combining multiple previous intermediate target positions P2. For example, the intermediate target positions in the 4, 8, or 16 previous cycles or the like are stored, the target positions are converted into an averaged smoothed target position P3 preferably by obtaining their moving averaging, and the result is output. The smoothing is not limited to simple moving averaging. In another example of moving averaging, if the previously output smoothed target position P3 and the current intermediate target position P2 are internally divided at a ratio of about 7:1, for example, the result that is obtained is substantially the same as that with the moving averaging of the previous 8 cycles.

Since the smoothed target position P3 reflects multiple intermediate target positions, even if the destination P1 suddenly changes during traveling, the change in the smoothed target position P3 will be gradual. Accordingly, the smoothed target position P3 does not change rapidly even in the case of performing processing to avoid interference between transport carriages, processing in which an allocated transport instruction is re-allocated to another transport carriage, and the like. However, there is the possibility of a signal in the vicinity of the characteristic frequency of the transport carriage 2 being included in the time series of the smoothed target positions P3. In view of this, a low pass filter 52, a band removing filter (not shown), or the like is preferably used to convert the time series of the smoothed target positions P3 into a signal in a frequency axis domain, and remove a high frequency components in the signal in the frequency axis domain, or remove components in the vicinity of the characteristic frequency. The signal from which the high frequency components or the components in the vicinity of the characteristic frequency was removed is then converted back into a signal in the time domain by the low pass filter 52 or the band removing filter, and set as the servo position instruction P4. Note that a configuration is possible in which the smoothing unit 50 and the low pass filter 52 are not provided separately, but rather one frequency filter that controls vibration of the transport carriage 2 is provided.

The servo position instruction P4 from the low pass filter 52 is input to an error amplifier 54. The other input to the error amplifier 54 is the traveling direction position obtained by the position sensor 12, and servo motors for travel (not shown) are controlled by operating the servo system 10 so as to eliminate error between the servo position instruction P4 and the actual position of the transport carriage 2.

Note that although the traveling control unit 8 is preferably defined by the destination generation unit 40 to the low pass filter 52, the smoothing unit 50 and the low pass filter 52 may alternatively be moved to a position between the traveling control unit 8 and the servo system 10. Also, the error amplifier 42 may alternatively receive a signal from the position sensor 12 instead of the intermediate target position P2 from the acceleration/deceleration control unit 44. Furthermore, a configuration is possible in which the acceleration/deceleration control unit 44 generates time series data for the intermediate target position P2 up to the destination P1 in advance, and inputs one piece of that data to the smoothing unit 50 per cycle. However, this is not efficient since the time series data for the intermediate target position P2 needs to be regenerated if the destination P1 changes.

FIG. 4 shows the application of constraints regarding acceleration, deceleration, and velocity. In the case where power is supplied from one contactless power feeding apparatus 38 to multiple transport carriages 2, the load on the power feeding apparatus 38 increases if transport carriages 2 accelerate at the maximum acceleration at the same time. In view of this, the output voltage of the capacitor 30 and the output voltage of the power receiving coil 28 are preferably monitored by the power controller 26, and the output voltages are converted into available power or energy and input to the acceleration restriction unit 46. If the maximum acceleration is restricted in accordance with the input values, it is possible to reduce the maximum acceleration when the load on the contactless power feeding apparatus 38 is high, and operate multiple transport carriages 2 with a small contactless power feeding apparatus 38. Note that the capacitor 30 is charged with power recovered by the servo motors during deceleration, for example.

Also, if the stress applied to the units of the transport carriage 2 is measured by the stress sensors, and the maximum acceleration and the maximum deceleration are restricted, it is possible to reduce the stress applied to the transport carriage 2, and improve the durability of the transport carriage 2. If the amount of change in maximum acceleration, the amount of change in maximum deceleration, and the like are restricted by the vibration sensors, it is possible to reduce the vibration applied to the transport carriage 2, the vibration applied to the transport articles, and the like. Note that this processing may be omitted, if so desired, because it is redundant with the processing performed by the smoothing unit 50. The velocity restriction unit 48 reduces the maximum velocity when the transport amount is low, thus reducing energy consumption. Also, a track data storage unit 56 is arranged and programmed to store a maximum velocity for various positions along the traveling track of the transport carriage 2, and to reduce the influence of traveling wind by reducing the maximum velocity in the vicinity of the two ends of the track, for example. Also, the maximum velocity or the like is preferably restricted in portions where the track state is poor.

Figure 5:
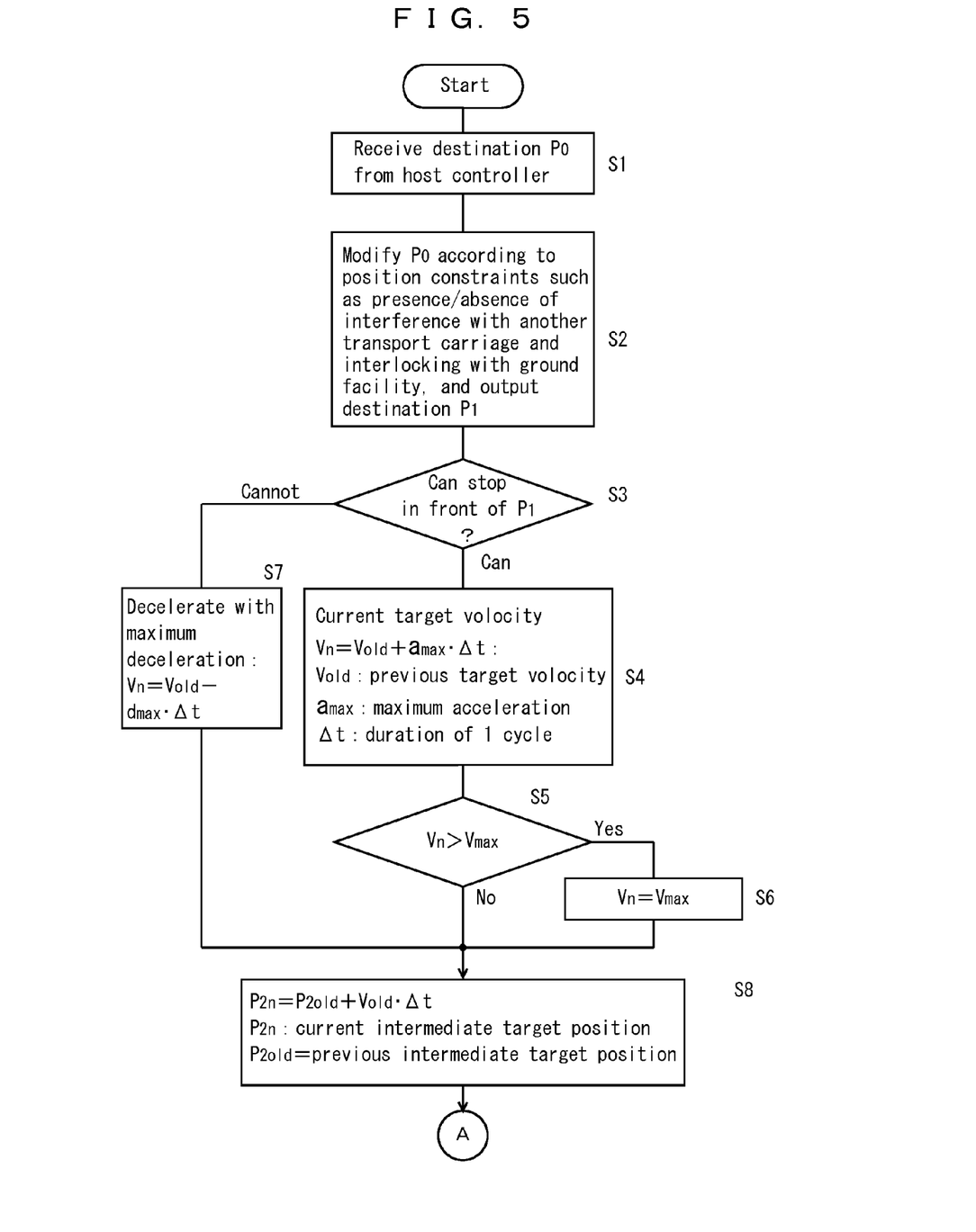
FIG. 5 is a flowchart showing a control algorithm according to a preferred embodiment of the present invention, showing processing up to the generation of a current intermediate target position P2$n$.
Figure 6:
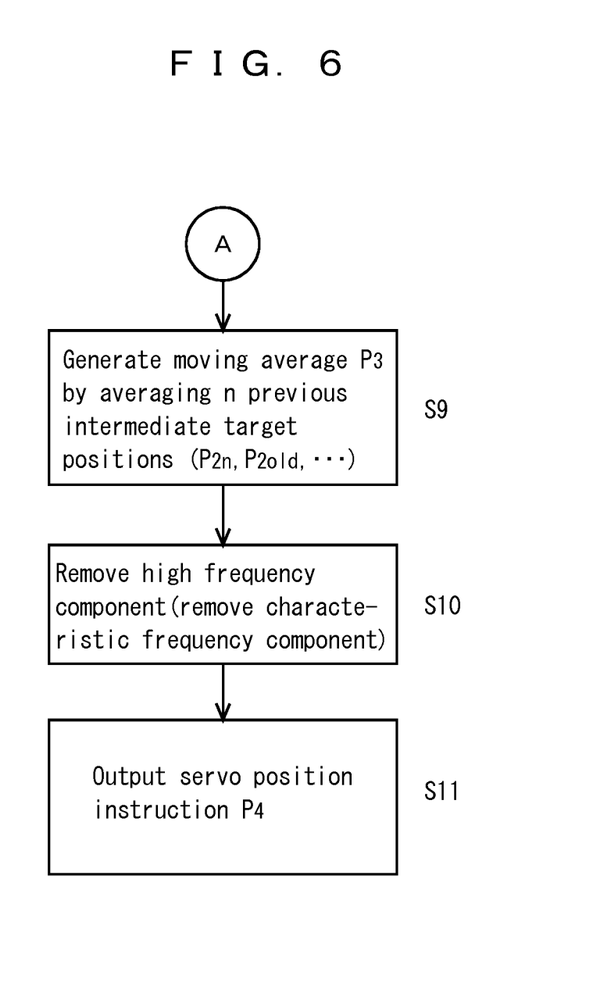
FIG. 6 is a flowchart showing a control algorithm according to a preferred embodiment of the present invention, showing processing up to the conversion of the current intermediate target position P2$n$ into a servo position instruction P4.
Figure 7:
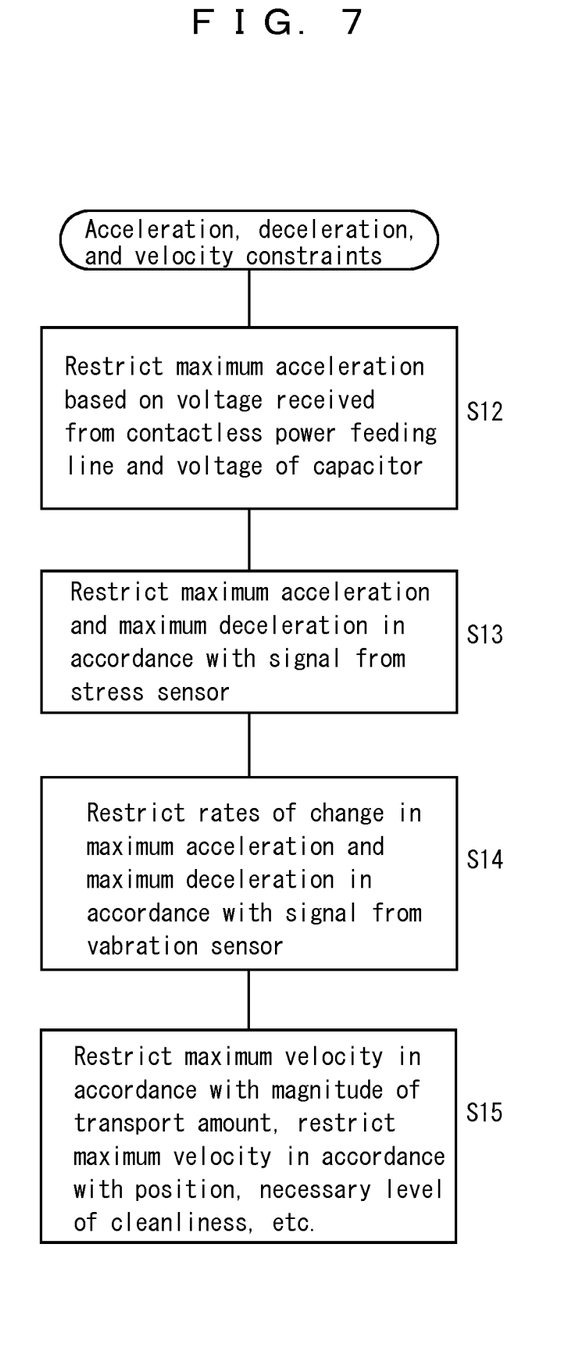
FIG. 7 is a flowchart showing a control algorithm according to a preferred embodiment of the present invention, showing constraint on acceleration, deceleration, and maximum velocity.

The following describes a control method of a preferred embodiment of the present invention with reference to FIGS. 5 to 7. FIGS. 5 and 6 show overall control, and in step S1, the destination P0 is received from the host controller. In step S2, the destination P0 is modified using constraint conditions such as, for example, the presence/absence of interference with another transport carriage, and interlocking with a ground facility, and the destination P1 is output. In step S3, it is determined whether or not it is possible to stop in front of the destination P1, and if it is possible to stop, the current intermediate target velocity Vn is determined such that acceleration is performed at a maximum acceleration amax. Specifically, Vn=Vold+amax·Δt, where Vold is the previous intermediate target velocity, amax is the maximum acceleration, and Δt is the duration of one cycle, which is 10 msec, for example (step S4). In step S5, it is determined whether or not Vn exceeds a maximum velocity Vmax, and in the case of an affirmative determination, Vn=Vmax in step S6. Also, if it is not possible to stop in front of P1, deceleration is performed at the maximum deceleration, and the current target velocity Vn is Vn=Vold-dmax·Δt, where dmax is the maximum deceleration (step S7).

The current target velocity Vn is used in the generation of the next intermediate target position, for example. The current intermediate target position P2n is determined using P2n=P2old+Vold·Δt, where P2old is the previous intermediate target position (step S8). Note that the equation P2n=P2old+Vn·Δt may be used.

Moving to FIG. 6, the average of n intermediate target positions P2 is obtained, and the smoothed target position P3 is obtained by performing moving averaging (step S9). High frequency components are then removed (step S10), and the servo position instruction P4 is output (step S11).

FIG. 7 shows processing related to constraints on acceleration, deceleration, and velocity, and in step S12, the maximum acceleration is restricted based on the voltage received from the contactless power feeding line and the voltage of the capacitor. Also, the maximum acceleration and the maximum deceleration are restricted in accordance with signals from stress sensors (step S13). The rates of change in the maximum acceleration and the maximum deceleration are restricted in accordance with signals from vibration sensors (step S14). Note that step S14 may be omitted, if so desired. Furthermore, the maximum velocity is restricted depending on the magnitude of the transport amount, and the maximum velocity is further restricted depending on the position on the track, the state of the track, the level of cleanliness that is needed, and the like (step S15).

Figure 8:
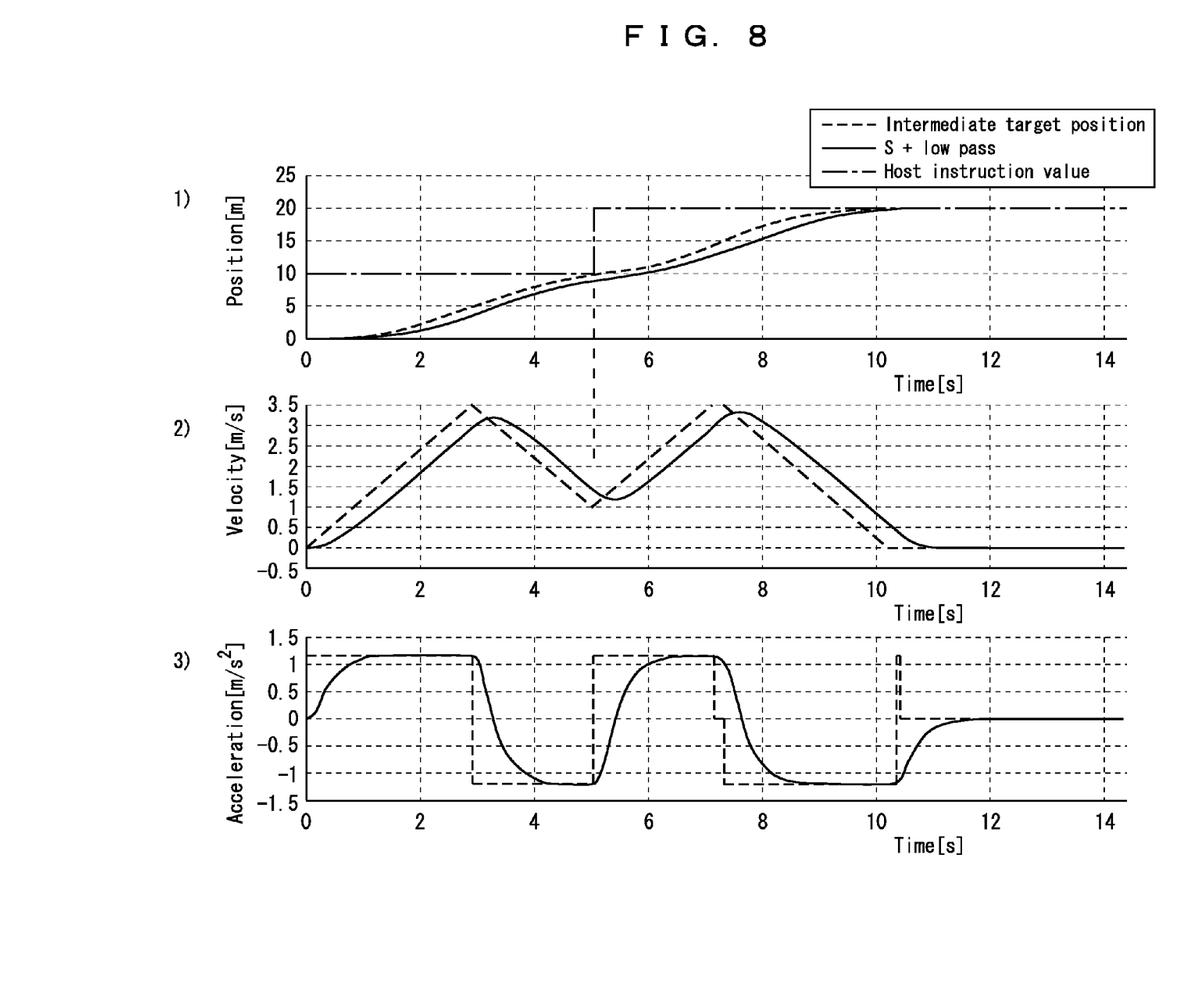
FIG. 8 shows waveform diagrams of a destination P0, an intermediate target position P2, and a servo position instruction P4 from a host controller in a preferred embodiment of the present invention, where 1) shows the transport carriage position, 2) shows the transport carriage velocity, and 3) shows the transport carriage acceleration, in an example where the destination is changed from about 10 m to about 20 m at the 5 sec mark, for example.
Figure 9:
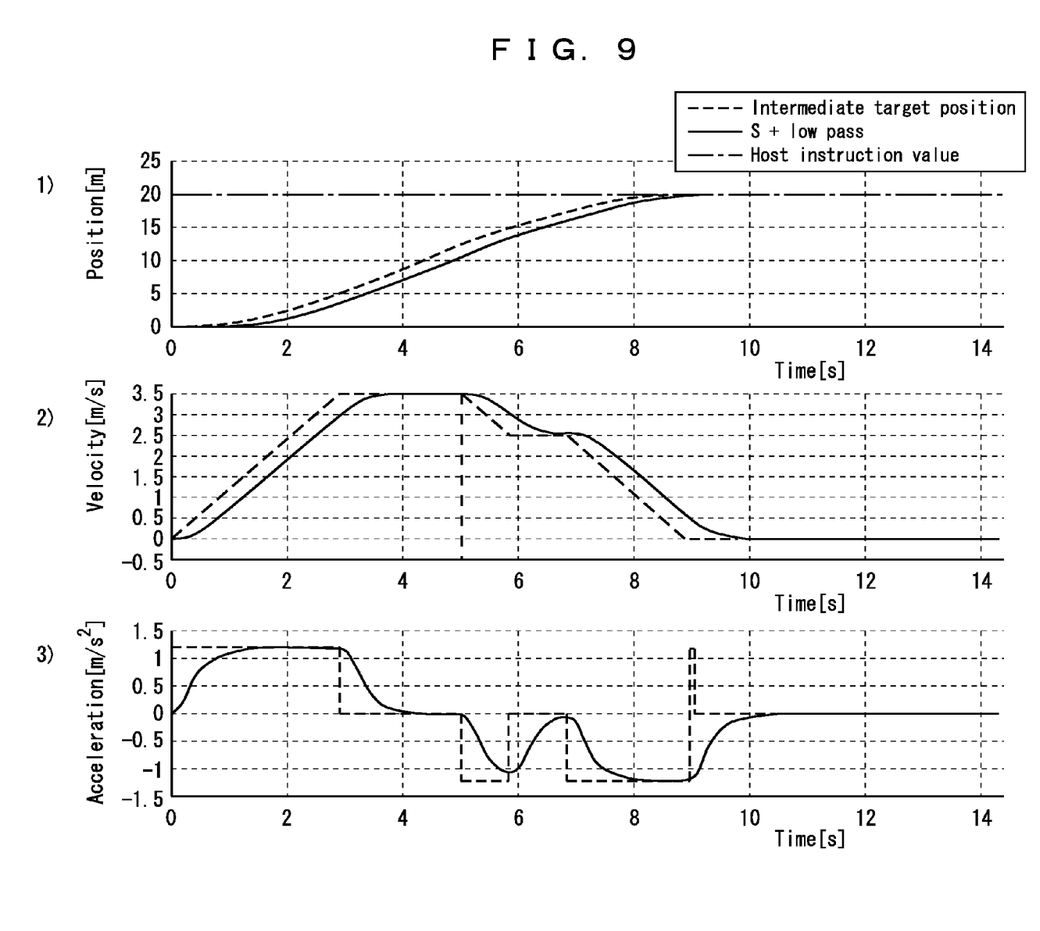
FIG. 9 shows waveform diagrams of the destination P0, the intermediate target position P2, and the servo position instruction P4 from the host controller in a preferred embodiment of the present invention, where 1) shows the transport carriage position, 2) shows the transport carriage velocity, and 3) shows the transport carriage acceleration, in an example where the maximum velocity is changed from about 210 m/min to about 150 m/min at the 5 sec mark, for example.

FIGS. 8 and 9 show servo position instructions that are obtained, and in these figures, dashed single-dotted lines indicate the destination as instructed by the host controller, dashed lines indicate the intermediate target position, and the solid lines indicate the servo position instruction obtained by moving averaging and the processing performed by the low pass filter. In FIG. 8, the destination is changed from about 10 m to about 20 m at the 5 sec mark, for example, and thus the velocity and the acceleration change as shown in 2) and 3) of FIG. 8, and smooth the servo position instruction is obtained through moving averaging and the processing performed by the low pass filter. In FIG. 9, the maximum velocity is changed from about 210 m/min to about 150 m/min at the 5 sec mark, for example, and thus the velocity and the acceleration change rapidly based on the intermediate target position, but the velocity and the acceleration change smoothly after being subjected to moving averaging and the low pass filter.

This preferred embodiment of the present invention obtains effects such as the following.

Even if the destination, the maximum velocity, the maximum acceleration, the maximum deceleration, or the like changes during traveling, the input to the servo system 10 preferably changes gradually, not rapidly. This is due to the smoothing unit 50. Accordingly, even if the destination or the like changes frequently in order to avoid interference between transport carriages 2 or the like, it is possible to travel smoothly.

The transport performance is high because the acceleration/deceleration control unit 44 generates the intermediate target position so as to travel for the shortest time within the range of the constraint conditions.

On the other hand, acceleration and deceleration are restricted in accordance with power consumption, stress, or the like, and the maximum velocity is preferably restricted in accordance with the state of the track or the like, thus making it possible for the transport carriages 2 to travel with the optimum velocity, acceleration, and deceleration.

In particular, restricting the maximum acceleration according to power consumption preferably enables driving multiple transport carriages 2 with a small contactless power feeding apparatus 38. Also, restricting the maximum acceleration and the maximum deceleration in accordance with stress enables reducing forces applied to the transport carriages 2 and the transport articles.

Restricting the maximum velocity and the like in accordance with the magnitude of the transport load, the position on the track, and the state of track preferably enables reducing energy consumption and mitigating traveling wind, for example.

The acceleration/deceleration control unit 44 need only generate the intermediate target position P2 for the next cycle, and it is not necessary to generate a velocity pattern for the range up to the destination P1. Accordingly, generated data is preferably not made useless even if the destination P1 is frequently changed, or the maximum acceleration, the maximum deceleration, the maximum velocity, or the like is changed.

LIST OF REFERENCE NUMERALS

2 Transport carriage
4 Host controller
6 Communication unit
8 Traveling control unit
10, 16, 22 Servo system
12, 18, 24 Position sensor
14 Elevation control unit
20 Transfer control unit 26 Power controller
28 Power receiving coil
30 Capacitor
32 Sensors
34 Ground facility
36 Fan filter unit
38 Contactless power feeding apparatus
40 Destination generation unit
42, 54 Error amplifier
44 Acceleration/deceleration control unit
46 Acceleration restriction unit
48 Velocity restriction unit
50 Smoothing unit
52 Low pass filter
56 Track data storage unit While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transport carriage system wherein a plurality of transport carriages travel, the system comprising:
    a common track on which the plurality of transport carriages travel;
    a servo system that is provided in each of the transport carriages and performs servo control with respect to traveling of each of the transport carriage; and
    a traveling control unit that is arranged and programmed to control the servo system and includes an acceleration/deceleration control unit that is arranged and programmed to generate an intermediate instruction for the servo system for a predetermined cycle and a smoothing unit that generates a smoothed instruction for the predetermined cycle by smoothing the intermediate instruction over a plurality of cycles; wherein
    the acceleration/deceleration control unit is arranged and programmed to generate the intermediate instruction with respect to a current cycle for each predetermined cycle such that the transport carriage travels at a maximum velocity in a range that satisfies at least one constraint condition regarding traveling of the transport carriage, and to store the at least one constraint condition in a variable manner;
    the at least one constraint condition includes a restriction regarding the maximum velocity of the transport carriage; and
    the at least one constraint condition is determined based on data stored, generated, or sensed by the traveling control unit.

2. The transport carriage system according to claim 1, wherein the smoothing unit is arranged and programmed to generate the smoothed instruction by obtaining a moving average of the intermediate instruction over a plurality of cycles.

3. The transport carriage system according to claim 2, wherein the traveling control unit further includes a filter that generates a servo position instruction by removing one of high frequency components and signals in a vicinity of a characteristic frequency of the transport carriage from the smoothed instruction and inputs the servo position instruction to the servo system.

4. The transport carriage system according to claim 1, wherein:
    the at least one constraint condition includes a plurality of constraint conditions;
    the acceleration/deceleration control unit is arranged and programmed to generate the intermediate instruction so as to satisfy the plurality of constraint conditions;
    the plurality of constraint conditions include restrictions regarding at least the maximum velocity, a maximum acceleration, and a maximum deceleration of the transport carriage.

5. The transport carriage system according to claim 4, wherein the intermediate instruction is defined by one of a target position for the current cycle and a target velocity for the current cycle.

6. The transport carriage system according to claim 5, wherein
    the transport carriage system further comprises a ground-based host controller that is arranged and programmed to provide a destination instruction to the transport carriages,
    the traveling control unit is provided in each of the transport carriages,
    the traveling control unit further includes a communication unit that is arranged and programmed to communicate with the host controller and other transport carriages, and a destination change unit that is arranged and programmed to change the destination indicated by the instruction from the host controller based on current positions, current velocities, and destinations received from other transport carriages, and to output the changed destination, and
    the acceleration/deceleration control unit is arranged and programmed to generate one of the target position and the target velocity for the current cycle based on a deviation between the destination output by the destination change unit and the current position of the transport carriage.

7. The transport carriage system according to claim 6, wherein
    the transport carriages each further include a vehicle-mounted power supply arranged to drive the servo system, and a power controller that is arranged and programmed to manage the vehicle-mounted power supply, and
    the traveling control unit further includes an acceleration restriction unit that is arranged and programmed to change the maximum acceleration in accordance with a signal from the power controller.

8. The transport carriage system according to claim 7, wherein the vehicle-mounted power supply is defined by a power receiving coil that is arranged to receive power from a common contactless power feeding apparatus that is provided so as to be ground-based, and a capacitor that is arranged to accumulate received power.

9. The transport carriage system according to claim 4, wherein:
    the traveling control unit includes an acceleration restriction unit and at least one sensor; and
    the acceleration restriction unit is arranged and programmed to change the maximum acceleration, the maximum deceleration, an amount of change in the maximum acceleration, and an amount of change in the maximum deceleration of the transport carriage according to values measured by the at least one sensor.

10. The transport carriage system according to claim 9, wherein the at least one sensor includes a stress sensor or a vibration sensor.

11. The transport carriage system according to claim 4, wherein:

the transport carriages each include a vehicle-mounted power supply arranged to drive the servo system, and a power controller that is arranged and programmed to manage the vehicle-mounted power supply;

the maximum acceleration of each of the transport carriages is restricted according to an amount of power that is supplied by the vehicle-mounted power supply.

12. The transport carriage system according to claim 1, wherein the constraint condition regarding the maximum velocity of the transport carriage reduces the range of the maximum velocity of the transport carriage near an end of the common track.

13. The transport carriage system according to claim 1, wherein the constraint condition regarding the maximum velocity of the transport carriage reduces the range of the maximum velocity of the transport carriage relative to a velocity of another transport carriage.

14. The transport carriage system according to claim 1, wherein the traveling control unit includes a track data storage unit that is arranged and programmed to store a plurality of constraint conditions regarding the maximum velocity of the transport carriage at a plurality of positions along the common track.

15. A transport carriage traveling control method for controlling traveling of a plurality of transport carriages,
the plurality of transport carriages traveling along a common track,
the transport carriages each including a servo system that performs servo control with respect to traveling of the transport carriage,
the method comprising:
an intermediate instruction generation step that generates an intermediate instruction with respect to a current cycle for the servo system in a predetermined cycle such that the transport carriage travels at a maximum velocity in a range that satisfies at least one constraint condition regarding traveling of the transport carriages, with an acceleration/deceleration control unit of a traveling control unit;
a smoothing step that generates a smoothed instruction for the predetermined cycle by smoothing the intermediate instruction over a plurality of cycles with a smoothing unit of the traveling control unit;
a control step that controls the servo system based on the smoothed instruction that was generated; and
a step that stores the at least one constraint condition in the acceleration/deceleration control unit in a variable manner; wherein
the at least one constraint condition includes a restriction regarding the maximum velocity of the transport carriage; and
the at least one constraint condition is determined based on data stored, generated, or sensed by the traveling control unit.

16. The transport carriage traveling control method according to claim 15, further comprising a step of generating a servo position instruction by removing one of a high frequency components and a signal in a vicinity of a characteristic frequency of the transport carriage from moving averaging of the smoothed instruction with a filter of the traveling control unit, the step being executed in each predetermined cycle, wherein
in the control step, the servo position instruction is input to the servo system in the predetermined cycle.

* * * * *